March 5, 1929. A. W. HARRIS 1,704,433
TRANSMISSION CLUTCH
Filed July 24, 1924 2 Sheets-Sheet 2
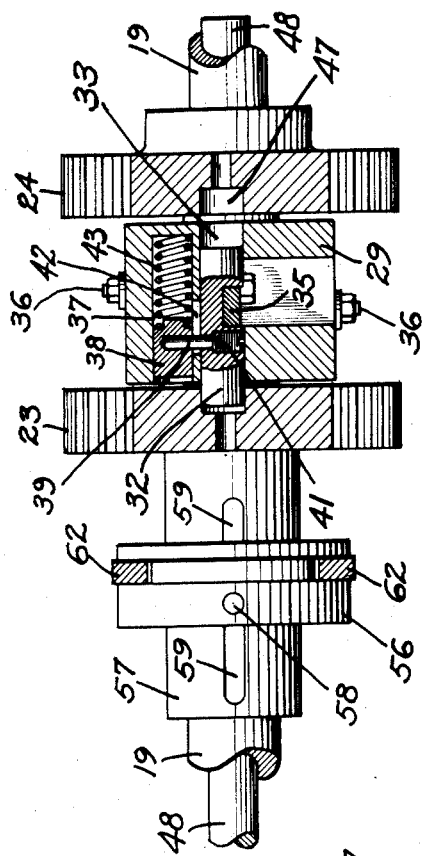
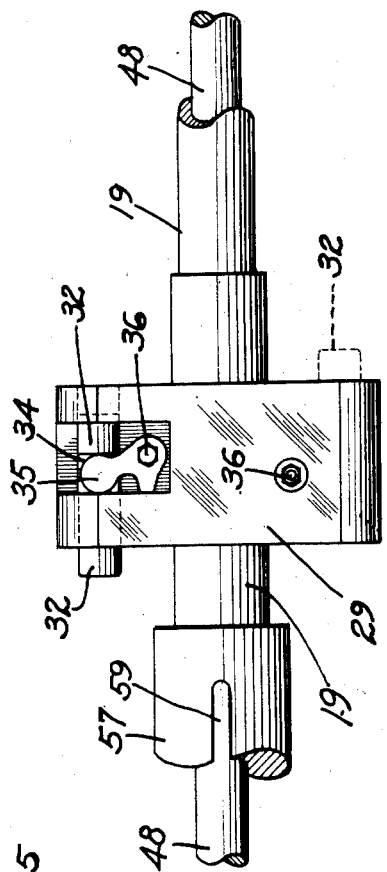
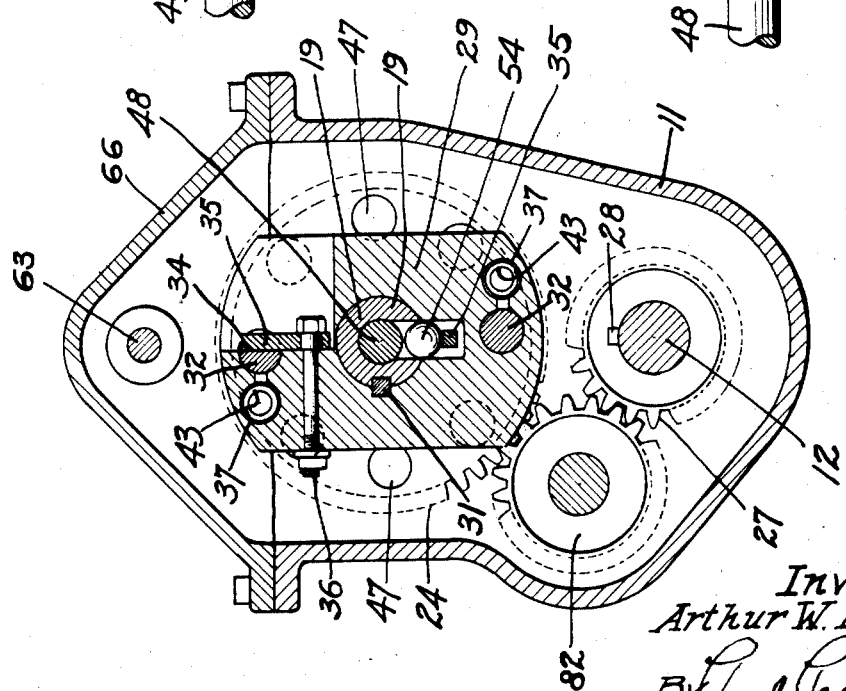
Inventor,
Arthur W. Harris
By Paul, Paul & Moore
Attorneys Patented Mar. 5, 1929.

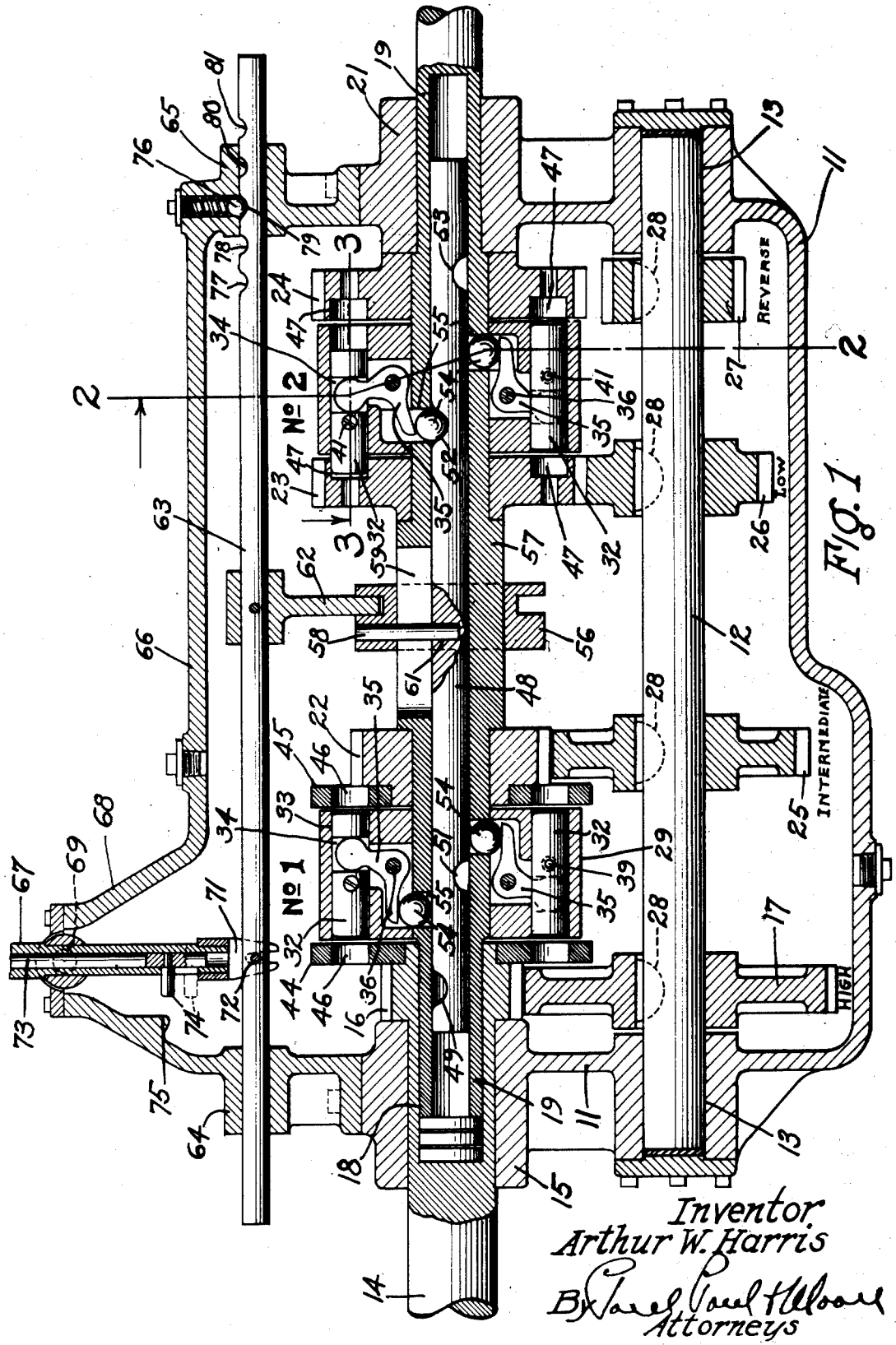

1,704,433

UNITED STATES PATENT OFFICE.

ARTHUR W. HARRIS, OF SLEEPY EYE, MINNESOTA.

TRANSMISSION CLUTCH.

Application filed July 24, 1924. Serial No. 727,953.

This invention relates to improvements in transmission clutches particularly adapted for use to impart variable speed to a driven member or shaft from a constantly rotating shaft or driving member, and more particularly relates to such clutches of the type adapted for use in connection with power propelled vehicles, such as automobiles and trucks, to impart variable speed from the usual engine crank shaft to the driven axle thereof.

Transmission mechanisms such as are commonly used in automobiles at the present time, usually employ sets of inter-meshing gears for transmitting power from the engine to the driven axle. These gears are usually adapted normally to be out of mesh with one another and are therefore provided with means whereby they may selectively be shifted into and out of mesh for the purpose of varying the speed of the automobile or to reverse the movement thereof. Such shifting of the gears into and out of mesh when the car is in motion, is objectionable, as the gears sometimes fail to readily slide into mesh with each other, caused by the teeth thereof not being in proper alinement when the shift is attempted or, as a result of improper manipulation of the gear shift lever and the clutch pedal, which is often the case when the car is being driven or operated by an inexperienced person or novice. Serious damage to the gears and associated parts may be caused by such clashing and interfering of the gear teeth, while the shift is being made.

In the novel transmission mechanism disclosed in this invention means are provided whereby variable speed may be obtained without the objectionable feature of having to shift the gears into and out of mesh with each other, all intermeshing gears therein being arranged to remain constantly in mesh. Generally stated, the transmission comprises a hollow driven shaft having simple clutch mechanisms mounted thereon which are adapted selectively and operatively to couple the hollow driven shaft to the driving member or engine shaft. The clutch mechanisms are actuated by means of a recessed rod axially and slidably mounted within the hollow driven shaft, which rod is preferably manually operable to vary the speed of the car, by means of an ordinary hand lever conveniently arranged for that purpose. The clutch mechanisms employed are provided with slidably mounted bolts or pins so arranged as to be moved into engagement with the driving member by a yieldable means, and are moved out of engagement therewith by a positive means.

The particular object of this invention, therefore, is to provide an improved clutch for transmissions of simple and inexpensive construction which will be substantially fool-proof in operation and will be positive and efficient in its action and performance.

Other objects of the invention will more fully appear from the following description and the accompanying drawings and will be pointed out in the annexed claims.

In the drawings there has been disclosed a structure designed to carry out the various objects of the invention but it is to be understood that the invention is not confined to the exact features shown, as various changes may be made within the scope of the claims which follow.

In the accompanying drawings forming a part of this specification,

Figure 1 is a vertical sectional view of my improved transmission in which my improved clutch devices are incorporated and showing the general construction thereof;

Figure 2 is a cross-sectional view on the line 2—2 of Figure 1;

Figure 3 is a detail sectional view on the line 3—3 of Figure 1, showing the means provided for yieldably moving the clutch pins into engagement with the driving members; and Figure 4 is a side elevation of one of the pair of clutches.

The variable speed transmission shown in the accompanying drawings comprises a casing 11 having a countershaft 12 rotatably mounted in suitable bearings 13 preferably provided in the lower portion thereof as shown in Figure 1. A drive shaft 14 is mounted in a bearing 15 at one end of the casing and has a pinion 16 terminally mounted thereon adapted to mesh with a relatively larger gear 17 mounted on the countershaft 12. The other end of the shaft 14 is adapted to be operatively connected to the engine crank shaft or other prime mover, not shown. Thus it will be seen that when the shaft 14 is rotated the countershaft 12 will likewise be rotated by means of the gears 16 and 17.

A socket 18 is preferably formed in the drive shaft 14 adapted to provide a bearing for one end of a hollow driven shaft 19, having its other end rotatably mounted in a bearing 21 provided at the opposite end of the casing 11. A series of speed change gears 22, 23 and 24 are loosely mounted on the hollow driven shaft and are adapted to be constantly intergeared with a series of similar gears 25, 26 and 27 secured to the countershaft 12, by such means as the keys 28. By this arrangement, it will be noted that whenever the countershaft 12 is rotated, the gears 22, 23 and 24 mounted on the driven shaft 19 will likewise be rotated without imparting any movement to the driven shaft. Means are therefore provided whereby one of the gears 22, 23 or 24 may be selectively connected to the driven shaft so that rotary movement may be imparted thereto. Such means preferably consists in the provision of suitable clutches being mounted on the driven shaft 19 between the drive pinion 16 and speed change gear 22, and also between the gears 23 and 24. These clutches are similar in construction and it will therefore be necessary to describe but one, like parts being referred to by like numerals.

For convenience in describing the operation of this device the clutch body mounted between the gears 16 and 22 will hereinafter be referred to as clutch body No. 1 and the one mounted between gears 23 and 24 as clutch body No. 2.

As shown in the drawings, each clutch comprises a body 29 secured to the driven shaft by means of a key 31. Each clutch body preferably has a pair of clutch pins 32 slidably mounted in opposed apertures 33, provided therein, and each of these pins has a recess 34 formed in one side thereof adapted to receive one end of a bell crank lever 35 which is pivotally mounted upon a pivot pin 36 secured to the clutch body 29, as particularly shown in Figure 2. A socket 37 is provided adjacent each pin 32 and has a plug 38 slidably mounted therein. These plugs are operatively connected to the pins 32 by means of shouldered pins 39 which are suitably secured to the clutch pins 32, by means of screw threads 41. Slots 42 are provided in the walls between the sockets 37 and apertures 33 to provide clearance for the pins 39, which pass therethrough. A compression spring 43 is mounted in each socket 37 which tends normally to force the plugs 38 outwardly and therefore the clutch pins 32 which are connected thereto by means of the pins 39. Driving members or disks 44 and 45 are secured to the pinion 16 and speed change gear 22, respectively, adjacent each side of the clutch body No. 1, as shown in Figure 1. These disks are provided with a plurality of apertures 46 adapted to receive the clutch pins 32 in order to lock the clutch body and therefore the driven shaft to one of the driving members. The speed change gears 23 and 24 are likewise provided with a plurality of apertures 47 adapted to receive the ends of the clutch pins 32 of the clutch body Number 2, as shown in Figure 1, wherein the clutch pin in the upper portion of the drawing, is shown as being in engagement with the gear 23.

The means provided for actuating the bell-crank levers 35 preferably consists in the provision of a rod 48 slidably mounted within the hollow driven shaft 19 and preferably coaxial therewith. This rod is provided with a series of recesses 49, 51, 52 and 53, each being adapted to receive one of the balls 54 which are mounted in apertures 55 provided in the wall of the hollow shaft 19. Each ball is adapted to engage one end of its complementary bell crank 35 so that when one of the balls is actuated, one of the clutch pins 32 will also be moved either into or out of engagement with its complementary driving member.

In Figure 1, it will be noted that the rod 48 has been moved so as to allow one of the balls of the clutch pair No. 2 to drop into the recess 52, thereby allowing the compression spring 43 to move the clutch pin into engagement with the driving gear 23. When thus positioned, the shaft 19 will be operatively connected to the countershaft 12 through the gears 23 and 26 and will be operated in what is commonly termed "low gear." It is to be understood, of course, that the recesses 49, 51, 52 and 53 in the slidable rod 48 are so spaced and arranged as to allow but one of the balls to be seated in one of the recesses at a time.

Means are provided for axially sliding the rod 48 within the hollow driven shaft 19 and such means preferably consists in the provision of a grooved collar 56 slidably mounted upon the enlarged central portion 57 of the driven shaft 19. This collar has a pin 58 secured thereto which passes through a slot 59 in the enlarged portion 57 of the driven shaft and has its other end terminally seated in a socket 61 provided in the rod 48. A forked arm 62 is mounted on a speed change rod 63 which is slidably mounted in bearings 64 and 65 provided in the upper portion 66 of the casing 11. An operating lever 67 is pivotally mounted in the raised portion 68 of the casing by such means as the pivot 69 and the lower end of this lever has a fork 71 mounted thereon adapted to straddle the rod 63 and also a pin 72 mounted in the rod, thereby to impart movement to the rod when the lever is manipulated. In order to prevent the operator from accidentally shifting the transmission into reverse gear when operating in any of the forward speeds, a rod 73 is preferably slidably mounted within the lever 67 and this rod has a stud or pin 74 mounted in the lower portion thereof which is arranged to engage a lug 75 provided in the upper portion 68 of the casing. Thus it will be seen that when the gear change rod 63 is forwardly moved, the pin 74 will engage the lug 75, thereby preventing the slidable rod 48 from moving sufficiently to allow the lower ball of the clutch pair No. 2 to move into the recess 53 and cause the transmission to be shifted into reverse gear. Furthermore, it will be noted that when unlocked a pin 32 may not be directly opposite a socket 46 and since the pin is spring-actuated to lock and positively actuated to unlock a gear, by a swift movement of the rod 48 one may skip locking an intermediate gear and shift directly from high. to low speed. The usual means for retaining the speed change rod 63, and therefore the slidable rod 48 in adjusted position is shown, and consists of a spring-actuated ball 76 mounted in a socket in the upper portion 66 of the casing and adapted to engage recesses 77, 78, 79, 80 and 81 provided in the rod 63. In Figure 2, there is shown the usual means provided for reversing the direction of rotation of the shaft 19 which consists in the provision of a pinion 82 mounted within the casing 11 and adapted to be in mesh with the speed change gear 24 and pinion 27. This construction, however, is common and need not be further described.

In the operation of this novel transmission the recessed rod 48 is selectively moved within the hollow shaft 19 by means of the forked arm 62, when the lever 67 is manually operated. When the ball 76 is seated in the recess 79 as here shown, the upper ball 54 of the clutch pair No. 2 will be seated in the recess 52 of the rod 48, thereby allowing the pin 32 to be moved into engagement with the driving gear 23. When the rod 63 is further moved to allow the ball 76 to enter the recess 78 the ball of the clutch pair No. 2 seated in the recess 52 will be upwardly moved out of the recess, thereby positively withdrawing the pin 32 from the socket 47 in the gear 23 and the recess 51 will then be moved into alignment with the socket 55 in the wall of the driven shaft 19, thereby allowing the ball shown in the lower part of the clutch pair No. 1 to drop into this recess with the result that the pin 32 will be moved into engagement with the driving disk 45 mounted on the gear 22. Further movement of the rod 48 will cause this ball to be unseated from the recess 51 and when the ball 76 enters the recess 77 in the rod 63, the recess 49 in the rod 48 will be moved into alignment with the ball in the upper part of the clutch pair No. 1, thereby allowing it to be seated therein with the result that its complementary pin 32 will be moved into engagement with the driving disk 44, thereby causing the driven shaft to be rotated therewith. When thus positioned, the driven shaft 19 will be directly connected with the driving shaft 14 and the transmission will be operating in direct or high speed.

By the use of the novel construction of the clutch pairs No. 1 and No. 2 this transmission may readily be shifted from one speed to another while the car is in motion without the danger of causing any damage to any of the parts thereof. Also by means of the stop pin 74 mounted in the lever 67, the operator may shift the transmission from high or intermediate speeds to neutral without any danger of going into reverse. When it is desired to shift the transmission from neutral into reverse, the rod 73 mounted in the lever 67 will be downwardly moved to allow the pin 74 to pass beneath the stop lug 75, as indicated by the dotted lines in Figure 1, thereby permitting the lever to be moved into reverse position in which position the ball 76 will be seated in the recess 81 in the rod 63. When thus positioned, the recess 53 in the rod 48 will be in alignment with the ball in the lower part of the clutch pair No. 2, thereby allowing its complementary pin to be moved into engagement with one of the sockets 47 in the reverse gear 24. Thus by the employment in conjunction with a variable speed transmission, of the novel clutch mechanism here shown, all of the speed change gears mounted therein will be constantly in mesh, thereby eliminating the objectionable feature of having to shift such gears into and out of mesh with each other when it is desired to vary the speed of the car.

I have also shown the use of two clutch pairs which is necessary in the construction of a transmission having three forward speeds and a reverse. Either one or more clutch pairs may be used depending upon the number of speeds desired.

I claim as my invention:

1. A variable speed transmission comprising a driven shaft, a gear having an opening therein and loosely mounted thereon, and spring actuated mechanism for locking and means for positively unlocking said loosely mounted gear on said driven shaft, said mechanism including a reciprocating clutch pin adapted to enter the opening in said loosely mounted gear, a bell crank loosely connected with said pin, and a rod having a notch therein for controlling the movement of said bell crank and the operation of said pin.

2. A variable speed transmission comprising a driven shaft having a loose gear thereon, a longitudinally movable rod having a recess therein, means for locking said gear to said shaft for the transmission of power therethrough including a longitudinally movable pin and a lever normally holding said pin in a retracted position and means adapted to enter a recess in said rod when it is moved to a predetermined position and permit the operation of said pin to lock the gear, and means for shifting said rod longitudinally.

3. A device of the class described including a driven shaft having a transverse hole therein and a ball in the hole, a gear loosely mounted on the shaft and mechanism for locking and positively unlocking said loosely mounted gear on said driven shaft said mechanism including a pin spring-actuated longitudinally in said clutch mechanism to lock the gear to the shaft and positively actuated mechanism to move the ball in the hole to move the pin in the other direction to unlock the gear.

4. In a device of the class described comprising a driven shaft having a transverse hole therein and a ball in the hole, a gear having an opening therein and loosely mounted on said shaft and mechanism for locking and positively unlocking said loosely mounted gear on said driven shaft said mechanism including a reciprocating clutch pin biased to enter the opening in said loosely mounted gear, and a rod having a notch therein and movable to operate the ball through the hole to move the pin out of said opening.

In witness whereof, I have hereunto set my hand this 18th day of July, 1924.

ARTHUR W. HARRIS.